Jan. 1, 1929.

E. N. JACOBI 1,696,957

LOCK FOR AUTOMOTIVE VEHICLES

Filed Oct. 25, 1926

Inventor,
Edward N. Jacobi
By Ira Milton Jones.
Attorney

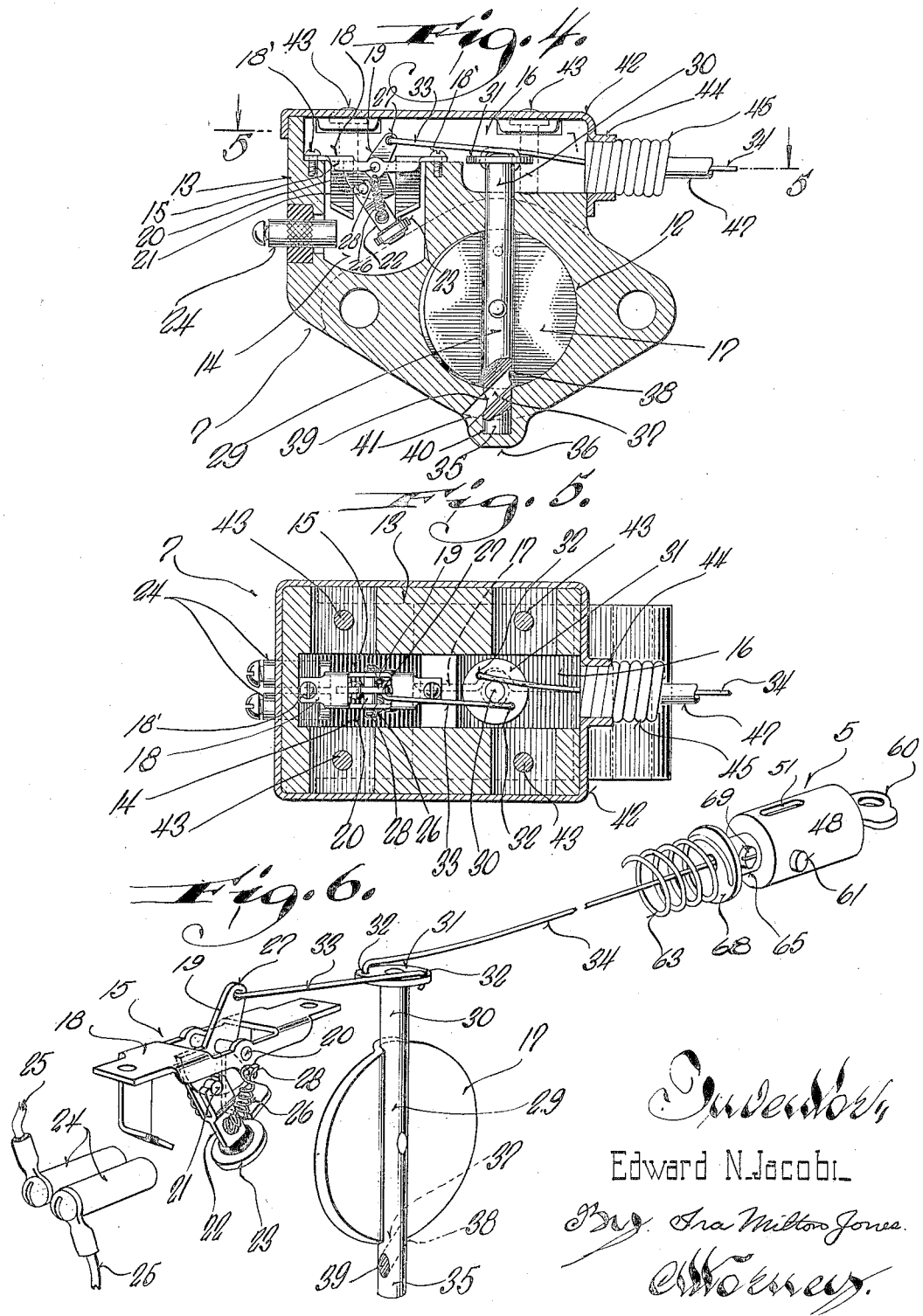

Patented Jan. 1, 1929.

1,696,957

UNITED STATES PATENT OFFICE.

EDWARD N. JACOBI, OF MILWAUKEE, WISCONSIN, ASSIGNOR TO BRIGGS & STRATTON CORPORATION, OF MILWAUKEE, WISCONSIN, A CORPORATION OF WISCONSIN.

LOCK FOR AUTOMOTIVE VEHICLES.

Application filed October 25, 1926. Serial No. 143,975.

It is an object of this invention to generally improve and simplify the construction of automobile locks of the type incorporated within the fuel system of the engine, the fuel shut-off valve, in the present instance, being located within the intake manifold at its point of connection with the carburetor.

Another object of my invention is to provide an improved fuel lock having means for shielding the same against tampering in the form of a hardened metal case and which is controlled from a point convenient to the operator by a key actuated member surrounded by a hardened casing.

This invention has as another object the provision of an improved automobile anti-theft device of the character described, wherein the key actuated member forms a button for operating the fuel control valve and a snap or quick make and break ignition switch.

A further object of this invention resides in the provision of an improved valve device incorporated within the shaft of the fuel cut-off valve to connect the engine side of the manifold with the atmosphere when the fuel valve is closed to facilitate coasting of the automobile, the engine of which is equipped with my improved invention, said air valve being closed as the fuel valve opens.

And a still further object of this invention resides in the provision of an improved ignition switch of the quick make and break type adapted to be mounted within a recess formed in the insert carrying the fuel supply locking valve, the ignition switch and valve being simultaneously operated by manipulation of a key actuated plug through the medium of a Bowden wire.

With the above and other objects in view, which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which;

Figure 4 is a view, partly in section and partly in elevation, taken through the fuel valve and ignition switch mechanism on the plane of the line 4—4 of Figure 1;

Figure 5 is a view, partly in section and partly in elevation, taken through Figure 4 on the plane of the line 5—5, and Figure 6 is a diagrammatic perspective view illustrating the ignition switch, fuel control valve and key actuated means detached from their protecting housing.

Figure 1:
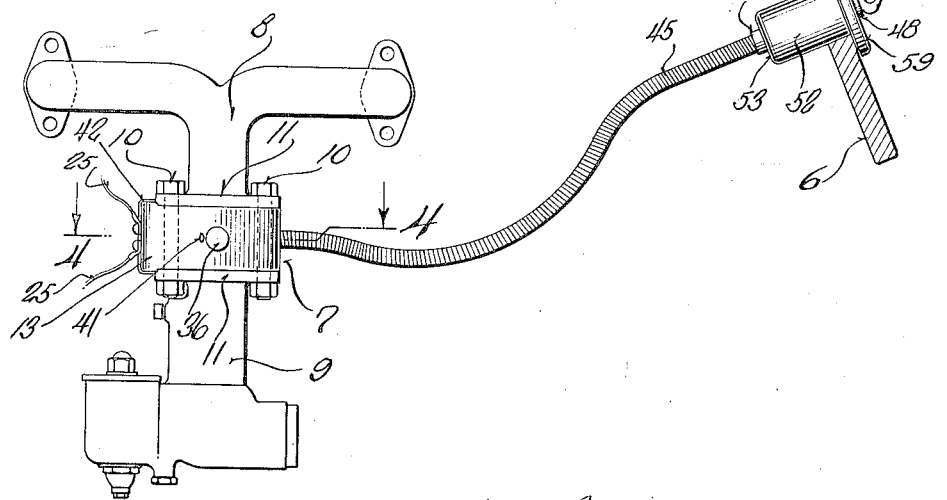
Figure 1 is a fragmentary view illustrating the intake manifold, carburetor and instrument panel or dash board of an automotive vehicle equipped with my improved ignition and fuel lock.

Referring now more particularly to the accompanying drawings in which like numerals designate like parts throughout the several views, 5 designates a key actuated control mechanism adapted to be mounted at the instrument panel or dash board 6 of an automobile equipped therewith, and 7 an insert containing a fuel control valve and an ignition switch, to be later described. The insert is adapted to be mounted between the intake manifold 8 and the carburetor 9 and there secured in place by bolts 10 also connecting the carburetor and manifold.

The insert 7, in the present embodiment, is made in one piece having a general shape in cross section to conform with that of the customary flanges 11 on the manifold and carburetor and has a central opening or bore 12 extended therethrough and registering with the bore of the manifold and carburetor chamber to form a continuation thereof. One side of the insert casting has an enlargement 13 thereon which is recessed, as at 14, to form an ignition switch chamber in which a circuit breaker 15, to be later described, is located. The outer face of the enlargement is recessed, as at 16, to receive the controlling connections between the switch, fuel butterfly valve 17, to be later described, and the key actuating means 5.

The circuit closure may be of conventional construction and includes a bridge work or frame 18 adapted to be suitably fixed in the chamber 14 by mounting screws or the like 18 and an actuator 19 pivoted therein, as at 20, and carrying pivot studs 21 on an extension eccentrically of the pivot 20. A movable contact arm 22 is pivoted from the studs 21 and carries a contact element 23 adapted to engage a pair of stationary contacts 24 included in the engine ignition circuit, indicated by the conductor 25, to complete the continuity of the circuit, a contractile spring 26 normally tending to disengage the contact 23 from the contacts 24 when the arm 27 of the actuator is in the position illustrated in Figure 6. A movement of the actuator arm 27 to the left with respect to Figure 6 will move the pivot studs 21 to the right of the point 28 where the spring 26 is connected with the bridge work 17, and the arm 22 is quickly moved to the left engaging the contact 23 with the contacts 24.

The valve 17 is preferably of the butterfly type and is fixed to a shaft 29 journaled in the insert and traversing the bore 12 with one end 30 extended into the recess 16 and having a disc 31 fixed thereto. The disc has two diametrically opposed apertures 32 therein, one of which is connected with the switch actuator arm 27 by a link 33, and the other being connected with the key actuating means by a Bowden wire 34, in the manner to be later described. The opposite end 35 of the valve shaft 29 is seated in the bore of an enlargement 36 formed on the insert and has a diagonal bore or passage 37 extended therethrough with one end 38 communicating with the bore 12 at the manifold side of the valve 17 and its other end 39 located within the bore 40 of the enlargement 36. A port or passage 41 leads from the bore 40 to the atmosphere and has its inner end in line to register with the port or passage 37 in the valve stem when the valve 17 is closed to permit the entrance of air into the manifold when the valve is closed.

Fitted over the enlargement 13 to completely enclose the end 30 of the valve stem and enclose the ignition switch and the operating connections, is a case hardened housing or cover 42 which is preferably secured in place by case hardened drive screws 43 to thus prevent the unauthorized removal of the housing by persons interested in obtaining the unauthorized use of the automobile. While it is a simple manner to complete the ignition circuit of a vehicle about an ignition switch, the protection thus afforded will render such an effort of no effect due to the fact that the valve 17 prevents the entrance of the combustible mixture into the engine cylinder.

One end of the housing 42 in line with the recess 16 is flanged, as at 44, to receive one end of a guard tube 45 having its other end connected with the key actuated mechanism 5. The tube 45 is preferably formed of hardened wire such as piano wire wound over an inner tube 46 of preferably hardened wire wound over an inner brass or annealed tube 47, the tube 47 serving as a guide for the Bowden wire 34 and retaining the tube, as a unit, in any shape in which the same is bent to offset any tendency of the wire 45 to straighten the tube, as will be readily apparent. This construction readily lends itself to various installations and permits the bending of the tube about obstacles without having the same come into contact with any moving parts. The tube 45 is secured in the flange or nipple 44 by any suitable means such as welding or the like.

The key actuated mechanism consists of a locking barrel mounting head 48 slidably mounted within a sleeve 49 and held against rotation by a limiting guide pin 50 carried by the sleeve and extended into an elongated recess 51 in the side of the barrel head. The sleeve 49 is enclosed within a housing 52 having an inwardly extending flange 53 on its inner end and between which and the adjacent end of the sleeve 49 the lateral flange 54 of a nipple 55, suitably fixed to the adjacent end of the tube 45, is secured. The outer end of the housing 52 is flanged laterally, as at 56, and has studs 57 threaded and preferably welded therein which pass through a washer 58 and an outer cap 59 to which the studs are welded or otherwise secured, the washer 58 retaining the sleeve 49 in position and the cap 59 forming a neat exterior appearance and guard.

Figure 2:
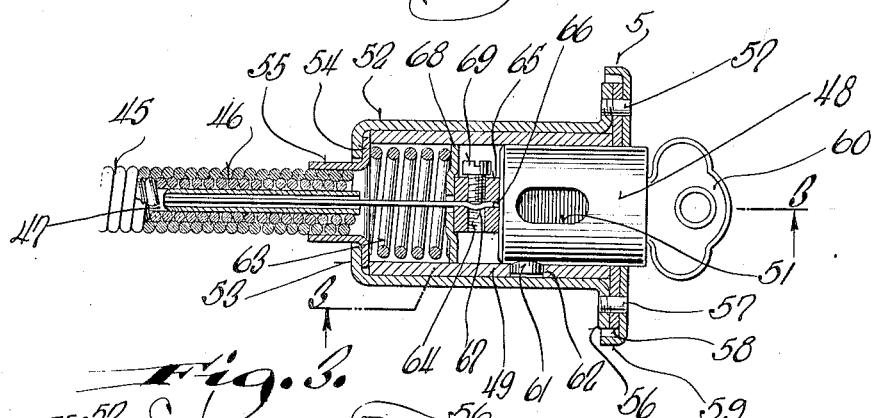
Figure 2 is a view, partly in section and partly in elevation, taken through the key actuated member of my device, said view being taken through Figure 3 on the plane of the line 2—2.
Figure 3:
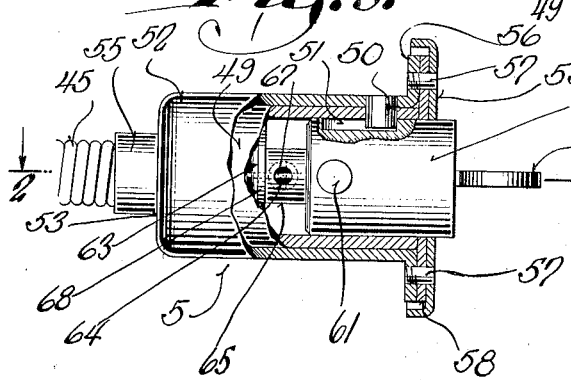
Figure 3 is a view similar to Figure 2 with the lock rotated through ninety degrees, said view being taken through Figure 2 on the plane of the line 3—3.

The lock barrel mounting head 49 is preferably of conventional construction having a key plug, not shown, rotatable therein to receive an actuating key 60, which, when of proper design and inserted therein, operates the various tumblers of the lock to permit the rotation of the plug to retract a locking pin 61 normally extended beyond the head 49 and engaged in a locking recess 62 in the sleeve 49 when the locking barrel is at one limit of movement. The head 48 is normally urged outwardly by a spring 63 confined between the inner end of the housing 52 and a washer normally bearing against a stud 65 fixed to the inner end of the barrel head 49 and which provides means for connecting the Bowden wire 34 therewith. The stud 65 has a longitudinal recess 66 therein to receive the adjacent end of the Bowden wire which is adapted to be kinked, as at 67, into a recess 68 by a set screw 69, as best shown in Figure 2.

With the parts in the positions illustrated in the drawings, the valve 17 is closed and the switch opened to thus render the automobile engine with which the device is connected inoperative and the insertion of a proper key 60 and its rotation to retract the locking lug 61 from its recess 62 permits the spring 63 to expand moving the locking barrel head 49 to its outward limit of movement and carrying with it the Bowden wire which by reason of its connection with the disc 31 rotates the shaft 29, moving the valve 16 to full open position. Rotation of the disc causes the link 33 to move the switch actuator arm 27 to the left with respect to Figure 6 engaging the movable switch contact with the stationary contacts 24 and completing the continuity of the engine circuit. When the automobile operator desires to stop the engine, the barrel locking head 49 is moved inwardly against its spring to a point where the locking pin 61 engages in its recess 62, and, as a result, the valve 17 is moved to closed position and the switch opened.

As some automobile operators often leave an automobile in speed with the ignition circuit open when coasting down hill to obtain the braking effect of the engine, my improved valve arrangement within the shaft or stem of the valve 17 permits atmospheric air to enter the manifold when the ignition circuit is opened to thus permit the most efficient use of the engine for this purpose, as will be readily apparent.

With the construction described above, it will be apparent that the locking barrel mounting head functions as an actuating button for controlling the operation of the ignition switch and the fuel control valve. The ignition switch being of a snap or quick make and break type, prevents outward lost motion of the actuating member by its spring 63 from re-closing the ignition switch after the valve has been closed, the engine stopped and the hand pressure on the button released.

From the foregoing description taken in connection with the accompanying drawings, it will be readily apparent to those skilled in the art to which an invention of the character described appertains, that I provide an improved automobile engine lock of a coincidental nature which will afford the greatest possible protection against theft, which is of extremely simple construction and which may be readily applied to all makes of automobiles either at the time of their manufacture or after their manufacture and one which is so constructed as to require practically no servicing after having been placed in use.

What I claim as my invention is:

1. In an internal combustion engine, a valve for controlling the passage of fuel to the engine, a quick make and break ignition switch, a cooperative connection between the valve and the switch whereby closing the valve opens the ignition switch, and opening of the valve closes the ignition switch, a locking device including a key controlled member, means mounting said member for limited movement, means normally urging the said member in one direction, a connection between said member and the valve and switch whereby movement of said member in one direction closes the valve and opens the switch against said urging means, and spring means opening the switch with a snap as the valve member approaches closed position, whereby limited outward movement of the mounting head after the switch is opened and the valve closed due to lost motion in the parts fails to reclose the switch.

2. In a fuel and ignition lock for motor vehicles, the combination with the ignition circuit of the engine of the motor vehicle and the fuel feed line leading from the carburetor to the motor, of an insert mounted in said fuel feed line and having a bore therethrough forming a part of the line, a valve stem journaled in the insert and having one end extending into a recess formed in one side thereof, a valve carried by said stem and movable with the stem to close the fuel feed line through the insert, a circuit closure mounted within a well in the insert adjacent said recess and adapted to be included in the motor ignition circuit, a connection between the valve stem and circuit closure whereby rotation of the valve stem in one direction actuates the closure to close the circuit and a rotation in a reverse direction actuates the closure to open the circuit, means connected with the valve stem for rotating the same, and a housing enclosing the well and recess of the insert to prevent unauthorized access to the valve and circuit closure operating means.

3. In a locking means for the fuel and ignition circuits of an internal combustion engine, a one-piece member having a longitudinal bore therethrough adapted to form a continuation of the fuel line of the engine, valve means for controlling the passage of fuel through the longitudinal bore, a valve operating stem extended from the valve into a recess in one side face of said member, switch instrumentalities included within the ignition circuit and mounted within a well in said member communicating with said recess, means connecting the switch instrumentalities with the valve stem whereby their operations are coordinated, and means for operating the switch instrumentalities and valve.

In testimony whereof I hereunto affix my signature.

EDWARD N. JACOBI.